United States Patent
Shinji et al.

(10) Patent No.: US 11,226,420 B2
(45) Date of Patent: Jan. 18, 2022

(54) PLASTIC SCINTILLATING FIBER AND METHOD OF MANUFACTURING THE SAME

(71) Applicant: KURARAY CO., LTD., Kurashiki (JP)

(72) Inventors: Osamu Shinji, Tainai (JP); Ryuichi Iwakawa, Tainai (JP)

(73) Assignee: KURARAY CO., LTD., Kurashiki (JP)

(*) Notice: Subject to any disclaimer, the term of this patent is extended or adjusted under 35 U.S.C. 154(b) by 0 days.

(21) Appl. No.: 16/311,563

(22) PCT Filed: Jun. 16, 2017

(86) PCT No.: PCT/JP2017/022312
§ 371 (c)(1),
(2) Date: Dec. 19, 2018

(87) PCT Pub. No.: WO2017/221828
PCT Pub. Date: Dec. 28, 2017

(65) Prior Publication Data
US 2019/0257957 A1    Aug. 22, 2019

(30) Foreign Application Priority Data

Jun. 21, 2016 (JP) .............................. JP2016-122735

(51) Int. Cl.
*G01T 1/203*        (2006.01)
*G01T 1/20*         (2006.01)
(Continued)

(52) U.S. Cl.
CPC .............. *G01T 1/203* (2013.01); *B29C 41/04* (2013.01); *B29D 11/00682* (2013.01);
(Continued)

(58) Field of Classification Search
CPC .. G01T 1/203; G01T 1/00; G01T 1/20; B29C 41/04; B29D 11/00682; G02B 6/02; G02B 6/028
See application file for complete search history.

(56) References Cited

U.S. PATENT DOCUMENTS 4,415,810 A * 11/1983 Brown, Sr. ........... G01T 1/1641
                                                    250/367
4,552,431 A * 11/1985 Allemand ............... G01T 1/203
                                                    385/124
(Continued)

FOREIGN PATENT DOCUMENTS

JP      59-46878 A      3/1984
JP      60-11 9509 A    6/1985
(Continued)

OTHER PUBLICATIONS

Im et al., Fabrication of a graded-index polymer optical fiber preform without a cavity by inclusion of an additional monomer under a centrifugal force field, Apr. 2002, Applied Optics, vol. 41, pp. 1858-1863 (Year: 2002).*

(Continued)

*Primary Examiner* — Christine S. Kim
(74) *Attorney, Agent, or Firm* — Oblon, McClelland, Maier & Neustadt, L.L.P.

(57) ABSTRACT

A plastic scintillating fiber capable of reducing modal dispersion and improving the accuracy of identifying a position which radiation passes through. A plastic scintillating fiber includes a core and a cladding that covers an outer periphery of the core and has a lower refractive index than the core. The core uniformly contains a radiation-emitting fluorescent agent and has a refractive index distribution where the refractive index of the core is highest at a center of a (Continued)

cross-section and becomes lower in a parabolic manner with distance from the center toward an outer periphery.

20 Claims, 5 Drawing Sheets

(51) Int. Cl.
*G01T 1/00* (2006.01)
*B29D 11/00* (2006.01)
*G02B 6/02* (2006.01)
*B29C 41/04* (2006.01)
*G02B 6/028* (2006.01)

(52) U.S. Cl.
CPC .................. *G01T 1/00* (2013.01); *G01T 1/20* (2013.01); *G02B 6/02* (2013.01); *G02B 6/028* (2013.01)

(56) References Cited

U.S. PATENT DOCUMENTS

| | | | | |
|---|---|---|---|---|
| 4,788,436 A | * | 11/1988 | Koechner | G01T 1/201 250/227.23 |
| 5,168,540 A | * | 12/1992 | Winn | C23C 16/18 385/128 |
| 5,235,660 A | * | 8/1993 | Perry | B29D 11/00721 385/124 |
| 5,555,525 A | * | 9/1996 | Ho | G02B 6/02038 385/143 |
| 5,585,915 A | * | 12/1996 | Kurosawa | G01J 1/04 250/227.31 |
| 5,588,084 A | * | 12/1996 | Johnson | G02B 6/0003 250/458.1 |
| 5,881,195 A | * | 3/1999 | Walker | G02B 6/02038 385/116 |
| 6,385,855 B1 | * | 5/2002 | Tymianski | F41G 1/345 33/263 |
| 6,682,666 B2 | | 1/2004 | Choi et al. | |
| 7,460,756 B2 | * | 12/2008 | Sato | B29D 11/00721 385/123 |
| 7,791,046 B2 | * | 9/2010 | Laine | G01T 1/20 250/483.1 |
| 2002/0009276 A1 | * | 1/2002 | Sugiyama | G02B 6/02038 385/124 |
| 2002/0031318 A1 | | 3/2002 | Choi et al. | |
| 2005/0111813 A1 | * | 5/2005 | Hajto | G02B 1/046 385/141 |
| 2005/0207714 A1 | | 9/2005 | Koike et al. | |
| 2007/0205526 A1 | | 9/2007 | Sato et al. | |
| 2015/0131937 A1 | | 5/2015 | Shinji et al. | |

FOREIGN PATENT DOCUMENTS

| | | |
|---|---|---|
| JP | 60-119510 A | 6/1985 |
| JP | 62-108208 A | 5/1987 |
| JP | 5-249247 A | 9/1993 |
| JP | 2002-107551 A | 4/2002 |
| JP | 2005-292180 A | 10/2005 |
| JP | WO 2013/179970 A1 | 12/2013 |
| JP | 2014-25833 A | 2/2014 |
| JP | WO 2015/046512 | 4/2015 |
| WO | WO 2004/025340 A1 | 3/2004 |

OTHER PUBLICATIONS

International Search Report dated Sep. 12, 2017 in PCT/JP2017/022312 filed on Jun. 16, 2017.
Extended European Search Report dated Dec. 6, 2019, in Patent Application No. 17815296.3, 7 pages.
Notice of Reasons for Rusual dated Mar. 9, 2021, in Japanese Patent Application No. 2018-524034 filed Jun. 16, 2017 (with machine generated English translation).

* cited by examiner

PLASTIC SCINTILLATING FIBER AND METHOD OF MANUFACTURING THE SAME

TECHNICAL FIELD

The present invention relates to a plastic scintillating fiber and a method of manufacturing the same and, particularly, to a plastic scintillating fiber and a method of manufacturing the same suitable for detection of high-dose radiation.

BACKGROUND ART

A plastic scintillating fiber (PSF) is a plastic fiber where a core, which is a scintillator, is covered on its outer periphery with a cladding having a lower refractive index than the core, and it is used mainly for detection of radiation. The core is typically made of a polymeric material where an organic fluorescent agent is added to a base material having an aromatic ring such as polystyrene or polyvinyl toluene, for example. The cladding is made of a low refractive index polymeric material such as polymethyl methacrylate or polymethyl methacrylate containing fluorine, for example.

The principle of detection of radiation using a scintillating fiber is described hereinafter. When radiation (X-rays, high energy electromagnetic waves such as γ-rays, or charged particle beams such as neutron beams, electron beams (β-rays) and proton beams) is applied to the core of the scintillating fiber, ultraviolet rays are emitted from the aromatic ring of the core base material. If a fluorescent agent is not added to the core base material, the ultraviolet rays are self-absorbed by the core base material and disappear instantaneously.

In the scintillating fiber, the ultraviolet rays are absorbed by the fluorescent agent added to the core base material, and light with a longer wavelength is re-emitted. Thus, by selecting an appropriate fluorescent agent, it is possible to convert the ultraviolet rays into light with a wavelength that is hardly self-absorbed by the core base material and allow the light to propagate through the fiber. The light that has propagated through the fiber is detected by a detector connected at one end or both ends. In this manner the scintillating fiber has two functions: radiation detection and optical transmission.

As a method for identifying a position which radiation passes through, the TOF (Time-of-flight) method is known (see Patent Literatures 1 to 3). The TOF method calculates a position which radiation passes through by placing detectors at both ends of a scintillating fiber and detecting a difference in time for light pulses emitted by radiation to arrive at the both ends of the fiber. It is thus important to accurately measure a time difference (temporal resolution) from when light is emitted by radiation to when the light arrives at the detectors at both ends.

Organic fluorescent agents generally have a shorter decay time from start to end of light emission and have a higher temporal resolution than inorganic fluorescent agents. On the other hand, because organic fluorescent agents are sensitive to heat, application to glass fibers is difficult.

Further, scintillating fibers for radiation detection generally have a size of 0.5 to 2.0 millimeters in outside diameter and several to several tens meters in length. Glass fibers of such a size are highly rigid and difficult to be wound into bobbin and transported and stored, fragile and easily broken, and highly costly.

In view of the above, plastic fibers containing organic fluorescent agents are mainly used as scintillating fibers for radiation detection.

Existing plastic scintillating fibers are step-index type, and it is composed of a core being transparent and having a high constant refractive index and a cladding having a lower refractive index than the core. Light emitted inside the core propagates through the fiber by repeating total reflection at the interface between the core and the cladding.

A light propagation mode in step-index optical fibers includes a mode where light travels in straight lines in parallel to the fiber (which is referred to as straight traveling mode) and a mode where light travels by repeating total reflection at the core-cladding interface (which is referred to as reflection mode). The reflection mode includes meridional rays that pass through the central axis of the fiber and helical rays that propagates in a helical fashion, being repeatedly reflected. The optical path length in the reflection mode is longer than the optical path length in the straight traveling mode, and therefore photons emitted from fluorescent agents suffer arrival time variations called modal dispersion. Thus, existing step-index plastic scintillating fibers have a problem that the accuracy of identifying a position which radiation passes through is low due to the modal dispersion.

Such a problem is particularly significant in high-dose radioactive fields, and this is described specifically with reference to FIGS. 4 and 5. FIGS. 4 and 5 are views for explaining a problem in existing step-index plastic scintillating fibers. FIGS. 4 and 5 show that radiation is applied to a step-index plastic scintillating fiber including a core 10 and a cladding 2, and photons are emitted from a fluorescence agent 3 in the core 10.

In a high-dose radioactive field, the frequency of irradiation per unit time is high, and therefore the frequency that radial rays (radial rays 1 and 2 in FIG. 4) simultaneously pass through different points in one plastic scintillating fiber is high as shown in FIG. 4. In such a case, the pulse width of signal pulses by photons 1 and 2 emitted by irradiation of the radial rays 1 and 2 spreads out due to the modal dispersion as shown in FIG. 4, and it is not possible to separate them from each other at the detector. Consequently, the accuracy of identifying a position which radiation passes through is low.

Further, in a high-dose radioactive field, there is a possibility that a plurality of radial rays (radial rays 1 to 3 in FIG. 5) arrive at a specific point in one plastic scintillating fiber one after another within a short period of time as shown in FIG. 5. In such a case also, the width of signals by photons 1 to 3 respectively emitted by irradiation of the radial rays 1 to 3 spreads out due to the modal dispersion as shown in FIG. 5, and it is not possible to separate them from one another at the detector. Consequently, the accuracy of identifying a position which radiation passes through is low.

Note that, in a low-dose field, the frequency of radiation passing through one plastic scintillating fiber is low, and it is thus possible to detect signals by emitted photons separately from one another.

In order to avoid such a problem in the step-index type, a graded-index type can be employed.

Patent Literature 4 discloses a method of manufacturing a graded-index plastic fiber that utilizes the volatilization phenomenon of monomers.

Patent Literature 5 discloses a method that rotates in an ampoule and hardens two or more types of polymerizable materials having different polymerization rates and different specific gravities before and after polymerization, and selectively presses the polymer with a greater specific gravity against the outer wall by the centrifugal force to form the graded-index profile.

Note that the graded-index plastic fibers disclosed in Patent Literatures 4 and 5 do not contain fluorescent agents, and thus are not scintillating fibers. Patent Literature 6 will be referred to later in the description of an embodiment of the invention.

CITATION LIST

Patent Literature

PTL1: International Patent Publication No. WO2013/179970
PTL2: Japanese Unexamined Patent Application Publication No. H5-249247
PTL3: Japanese Unexamined Patent Application Publication No. 2014-25833
PTL4: Japanese Unexamined Patent Application Publication No. S62-108208
PTL5: Japanese Unexamined Patent Application Publication No. S60-119510
PTL6: International Patent Publication No. WO2015/046512

SUMMARY OF INVENTION

Technical Problem

The inventors of the present invention have found the following problem when applying a graded-index plastic fiber to a scintillating fiber.

In the method disclosed in Patent Literature 4, even if a fluorescent agent is added to a monomer, because the volatility is different between the fluorescent agent and the monomer, the distribution of the fluorescent agent in the core is not uniform. Therefore, the accuracy of identifying a position which radiation passes through is not high enough.

In the method disclosed in Patent Literature 5, even if a fluorescent agent is added to the two or more types of polymerizable materials having different polymerization rates and different specific gravities before and after polymerization, because the polymerization rate is different, non-uniform concentration distribution occurs also in the fluorescent agent to be incorporated. Accordingly, the distribution of the fluorescent agent in the core is not uniform, and the accuracy of identifying a position which radiation passes through is not high enough.

As described above, even if a fluorescent agent is added to graded-index plastic fibers according to related art, it is difficult to achieve the uniform distribution of the fluorescent agent in the core, and therefore it has been impossible to obtain a plastic scintillating fiber having the sufficiently high accuracy of identifying a position which radiation passes through.

An object of the present invention is to provide a plastic scintillating fiber capable of reducing the modal dispersion and improving the accuracy of identifying a position which radiation passes through.

Solution to Problem

A plastic scintillating fiber according to one aspect of the invention includes a core and a cladding that covers an outer periphery of the core and has a lower refractive index than the core, wherein the core uniformly contains a radiation-emitting fluorescent agent and has a refractive index distribution where the refractive index of the core is highest at a center of a cross-section and becomes lower in a parabolic manner with distance from the center toward an outer periphery.

Thus, the core uniformly contains a radiation-emitting fluorescent agent and has a refractive index distribution where the refractive index of the core is highest at a center of a cross-section and becomes lower in a parabolic manner with distance from the center toward an outer periphery. It is thereby possible to reduce the modal dispersion and improve the accuracy of identifying a position which radiation passes through.

It is preferred that a layer having a constant refractive index corresponding to the lowest refractive index in the core is formed on an outermost periphery of the core.

It is thereby possible to enhance the melt adhesion between the core and the cladding and reduce residual bubbles.

A method of manufacturing a plastic scintillating fiber according to one aspect of the invention is a method of manufacturing a plastic scintillating fiber including a core and a cladding that covers an outer periphery of the core, the method including manufacturing a graded-index plastic rod by continuously injecting a mixture of two or more types of radical polymerizable monomers having different refractive indices into a cylindrical container placed with its central axis horizontally oriented and rotated about the central axis through an inlet at a center of one end of the cylindrical container, and depositing hardened layers sequentially from an inner periphery of the cylindrical container toward the central axis by centrifugal force, and manufacturing the core in a fiber form by heating a tip of the plastic rod and drawing the plastic rod into a fiber, wherein in manufacturing of the plastic rod, each of the two or more types of radical polymerizable monomers contains a radiation-emitting fluorescent agent at the same concentration, and the mixture is injected while continuously varying a mass mixing ratio of the two or more types of radical polymerizable monomers so that the refractive index of the plastic rod is highest at a center of a cross-section and becomes lower in a parabolic manner with distance from the center toward an outer periphery.

Thus, the plastic scintillating fiber in which the core uniformly contains a radiation-emitting fluorescent agent and has a refractive index distribution where the refractive index of the core is highest at a center of a cross-section and becomes lower in a parabolic manner with distance from the center toward an outer periphery is obtained. It is thereby possible to reduce the modal dispersion and improve the accuracy of identifying a position which radiation passes through.

The method preferably includes inserting the plastic rod into a plastic pipe having a lower refractive index than the plastic rod. It is thereby possible to efficiently manufacture the plastic scintillating fiber.

Manufacturing of the core is preferably carried out under a reduced pressure. It is thereby possible to prevent an empty space that is left at the center of the plastic rod for monomer injection, a gap between the plastic rod and the pipe and the like from remaining as air bubbles.

In manufacturing of the plastic rod, it is preferred to form a layer having a constant refractive index corresponding to the lowest refractive index in the plastic rod on an outermost periphery of the plastic rod.

It is thereby possible to enhance the melt adhesion between the core and the cladding and reduce residual bubbles.

Advantageous Effects of Invention

According to the present invention, it is possible to provide a plastic scintillating fiber capable of reducing the modal dispersion and improving the accuracy of identifying a position which radiation passes through.

DESCRIPTION OF EMBODIMENTS

Figure 1:
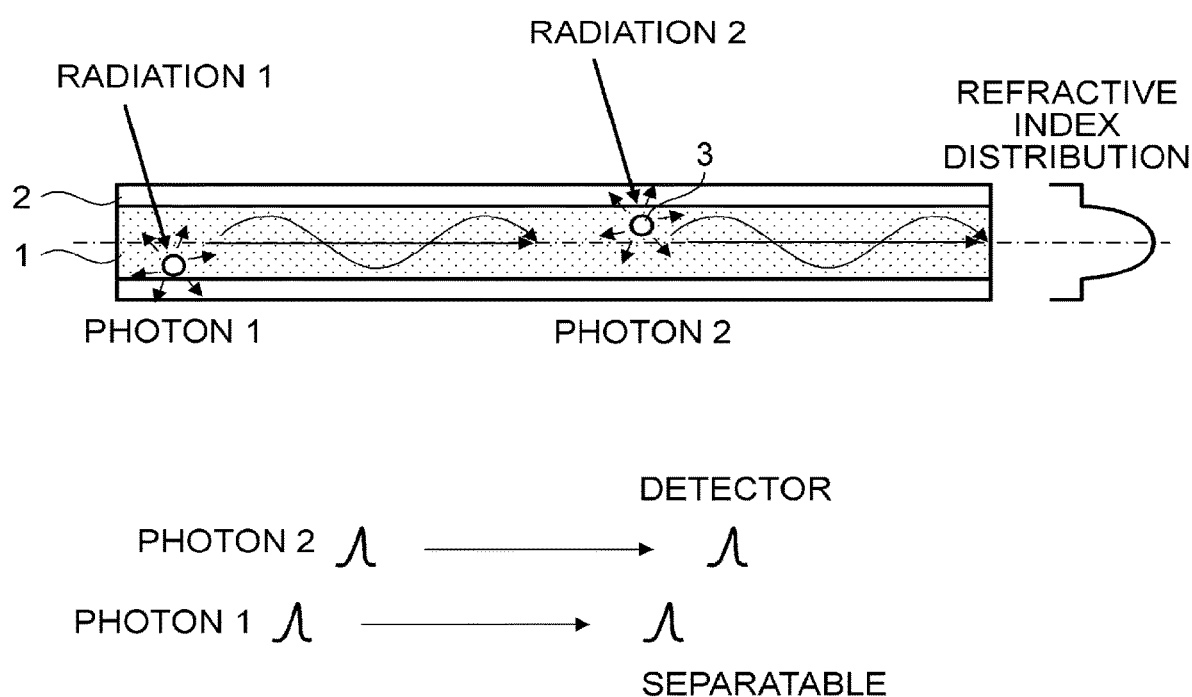
FIG. 1 is a longitudinal sectional view of a plastic scintillating fiber according to a first embodiment.
Figure 2:
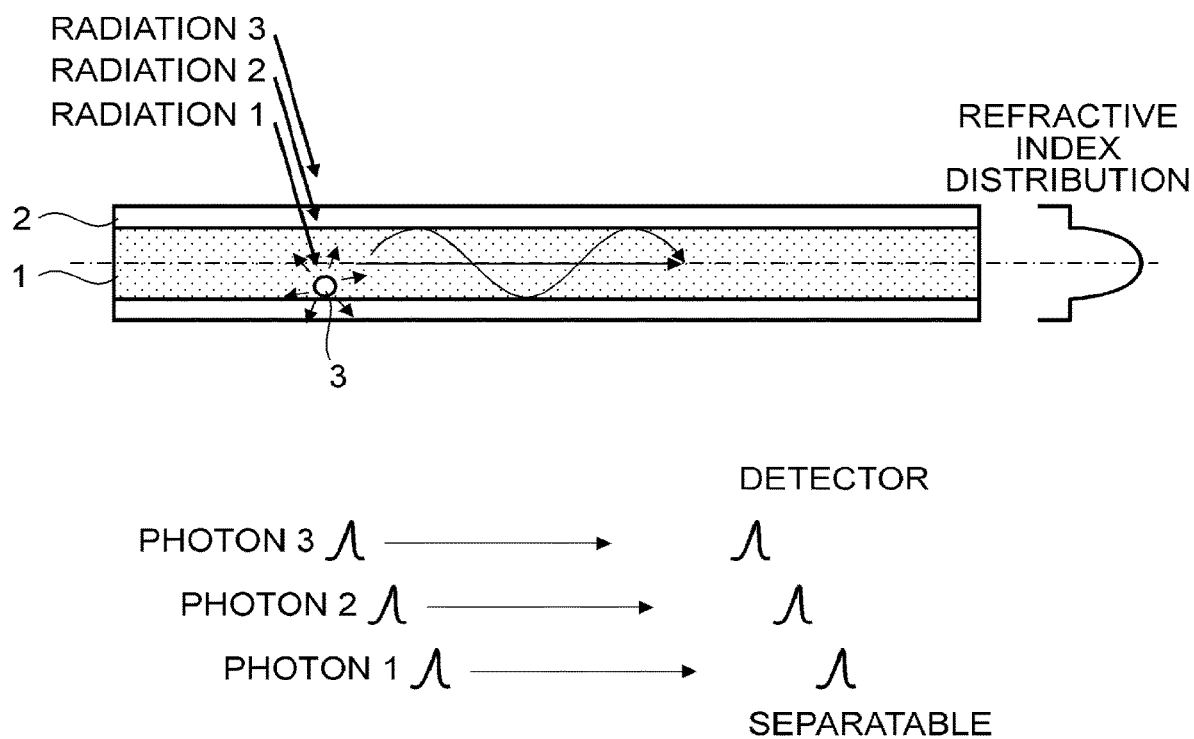
FIG. 2 is a longitudinal sectional view of the plastic scintillating fiber according to the first embodiment.

An embodiment of the present invention is described hereinafter with reference to the drawings. FIGS. 1 and 2 are longitudinal sectional views of a plastic scintillating fiber according to a first embodiment.

Figure 4:
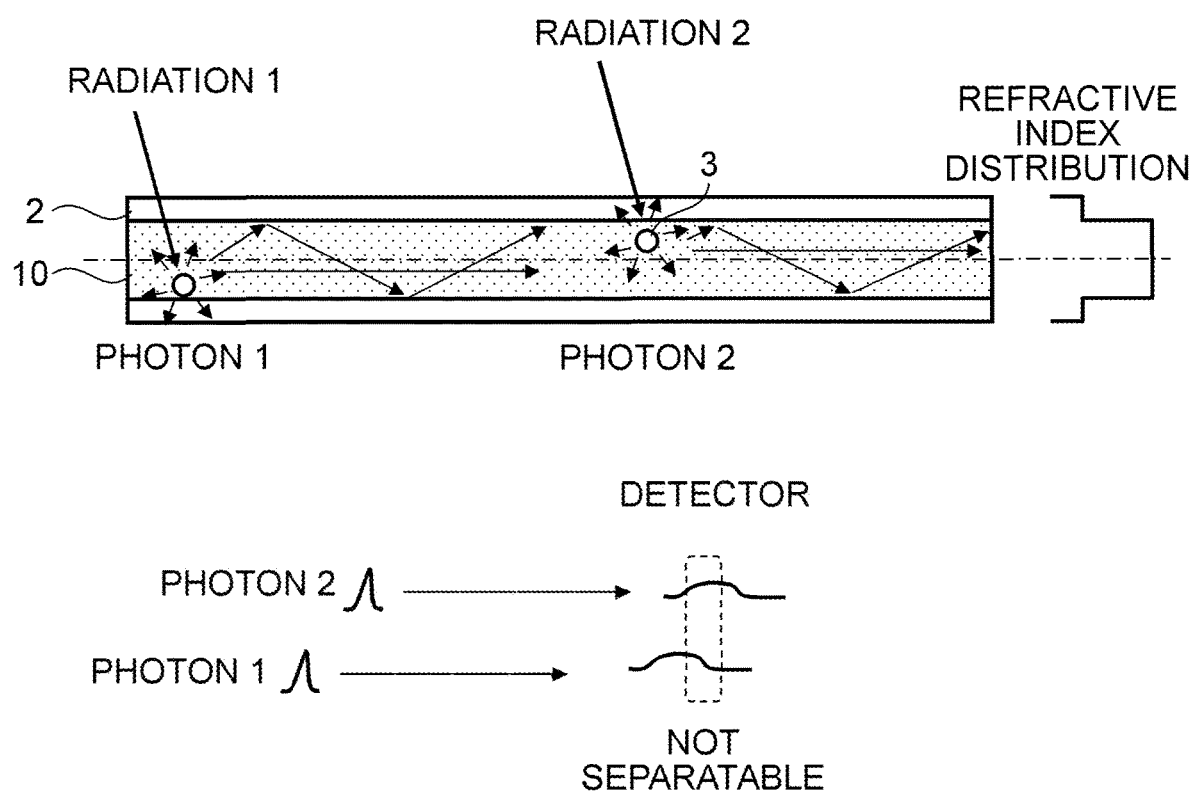
FIG. 4 is a view illustrating a problem in a step-index plastic scintillating fiber according to related art.
Figure 5:
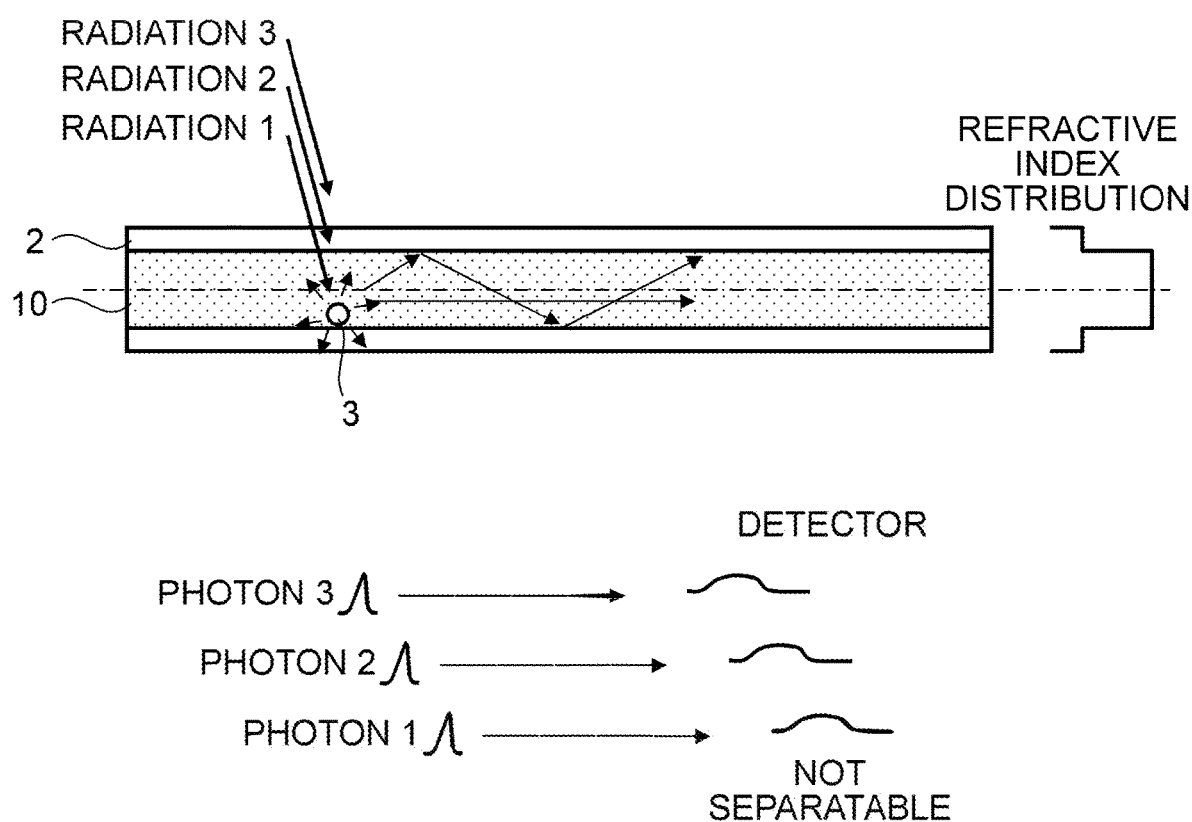
FIG. 5 is a view illustrating a problem in a step-index plastic scintillating fiber according to related art.

As shown in FIGS. 1 and 2, the plastic scintillating fiber according to this embodiment is a graded-index plastic scintillating fiber including a core 1 and a cladding 2 that covers the outer periphery of the core 1. FIGS. 1 and 2 are views corresponding to FIGS. 4 and 5, respectively, and show that radiation is applied to the plastic scintillating fiber, and photons are emitted from a fluorescence agent 3 in the core 1.

The diameter of the plastic scintillating fiber is preferably 0.1 to 2 mm, for example.

The core 1 has a parabolic graded-index profile at a given cross-section. Specifically, the refractive index distribution is such that the refractive index is highest at the center indicated by the alternate long and short dash line and becomes lower in a parabolic manner with distance from the center toward the outer periphery, as shown on the right of the longitudinal sectional views of the plastic scintillating fiber in FIGS. 1 and 2.

Further, the core 1 uniformly contains a radiation-emitting fluorescent agent.

The cladding 2 has a refractive index which is lower than that of the core 1 and which is substantially constant.

Because the core 1 has a parabolic graded-index profile, the plastic scintillating fiber according to this embodiment is capable of reducing the modal dispersion and improving the accuracy of identifying a position which radiation passes through. Its principle is as follows.

Light has the property of bending from a lower refractive index medium to a higher refractive index medium. Therefore, the light propagation mode in the core 1 having a parabolic graded-index profile includes a mode where light travels in straight lines along the central axis with the highest refractive index (which is referred to hereinafter as straight traveling mode), a mode where light travels while being refracted in a sine curve fashion with respect to the central axis as the horizontal axis, and a mode where light travels in a helical fashion without passing through the central axis (both of which are referred to as refraction mode).

In the core 1 having a parabolic graded-index profile, the optical path length, which is a product of the traveling distance and the refractive index, is the same between the straight traveling mode and the refraction mode. It is thereby possible to reduce the modal dispersion.

Specifically, in the graded-index plastic scintillating fiber according to this embodiment, the arrival time of photons emitted from fluorescent agents at the detector is the same regardless of the path, and the modal dispersion is reduced. It is thereby possible to improve the accuracy of identifying a position which radiation passes through compared with step-index plastic scintillating fibers.

Further, in graded-index plastic fibers according to related art, it is difficult for the core to uniformly contain the fluorescent agent, and therefore it has been impossible to achieve the sufficiently high accuracy of identifying a position which radiation passes through. On the other hand, in the plastic scintillating fiber according to this embodiment, the core 1 can uniformly contain the fluorescent agent, and it is thereby possible to achieve the sufficiently high accuracy of identifying a position which radiation passes through.

This is described more specifically with reference to FIGS. 1 and 2.

In a high-dose radioactive field, the frequency that radial rays (radial rays 1 and 2 in FIG. 1) simultaneously pass through different points in one plastic scintillating fiber is high as shown in FIG. 1. Even in such a case, the width of signals by photons 1 and 2 emitted by irradiation of the radial rays 1 and 2 does not spread out due to the modal dispersion as shown in FIG. 1, and it is possible to separate them from each other at the detector. Consequently, the accuracy of identifying a position which radiation passes through is improved.

Further, in a high-dose radioactive field, there is a possibility that a plurality of radial rays (radial rays 1 to 3 in FIG. 2) arrive at a specific point in one plastic scintillating fiber one after another as shown in FIG. 2. Even in such a case also, the width of signals by photons 1 to 3 respectively emitted by irradiation of the radial rays 1 to 3 does not spread out due to the modal dispersion as shown in FIG. 2, and it is possible to separate them from one another at the detector. Consequently, the accuracy of identifying a position which radiation passes through is improved.

The parabolic graded-index profile is specifically represented by the following equation:

$$n_{(r)} = n_0 \sqrt{1-(g \cdot r)^2}$$

where each symbol is as follows.

Figure 3:
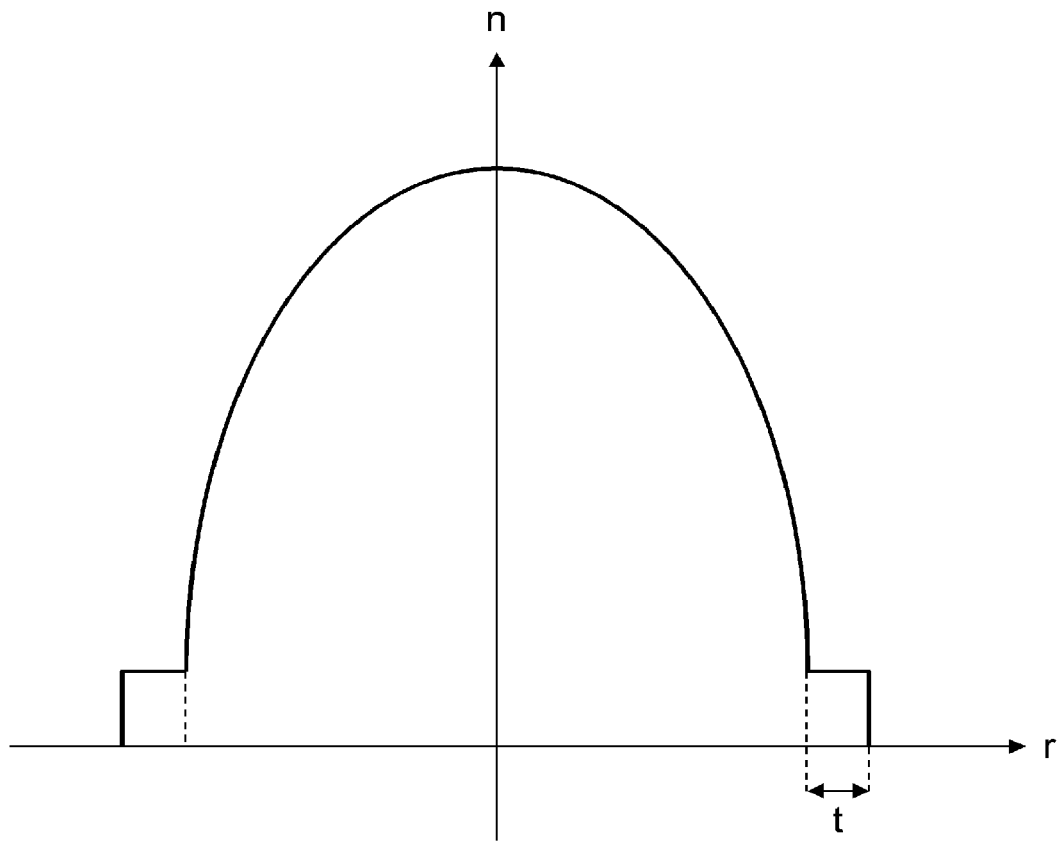
FIG. 3 is a graph showing in more detail an example of a refractive index distribution on a cross-section of a core of the plastic scintillating fiber according to the first embodiment.

$n_{(r)}$: refractive index at a position with a distance r from the central axis, g: refractive index distribution constant, r: distance from the central axis toward the outer periphery, n refractive index at the central axis of the plastic scintillating fiber FIG. 3 is a graph showing in more detail an example of the refractive index distribution on the cross-section of the core of the plastic scintillating fiber according to the first embodiment. The horizontal axis indicates the distance r from the center (i.e., the central axis of the plastic scintillating fiber) toward the outer periphery, and the vertical axis indicates the refractive index n. The refractive index in the horizontal axis indicates the refractive index of the cladding. As shown in FIG. 3, the refractive index is highest at the center, and becomes lower in a parabolic manner with an increase in the distance r. The refractive index distribution shown in FIG. 3 is an ideal form, and manufacturing variations like parabola similarity or pseudo-parabola are allowed as a matter of course.

Further, as shown in FIG. 3, on the outermost periphery of the core, a layer made only of a low refractive index monomer that constitutes the core and having a constant refractive index, which corresponds to the lowest refractive index in the core, may be formed with a thickness of t. This enhances the melt adhesion between the core and the cladding and reduces residual bubbles. The thickness t is about 3 to 10 μm, for example.

The length of the plastic scintillating fiber according to the present invention is preferably 5 m or longer, and more preferably 10 m or longer. Because the modal dispersion is reduced in the plastic scintillating fiber according to the present invention, it can be used suitably even when the plastic scintillating fiber is long.

[Raw Materials]

Raw materials of the core used in the plastic scintillating fiber are not limited as long as they are transparent. Particularly, a copolymer composed of any one of methacrylic acid ester monomers typified by methyl methacrylate, acrylic acid ester monomers typified by methyl acrylate, and aromatic monomers having a vinyl group typified by styrene is preferable. A copolymer composed of aromatic monomers having a vinyl group is particularly preferable. Monomer species used for copolymerization is not limited as long as two or more types are used.

Raw materials used for the cladding in the plastic scintillating fiber are not limited as long as they are transparent and have a lower refractive index than the material of the outermost periphery that forms the core. Particularly, a polymer or copolymer whose raw materials are any one of methacrylic acid ester monomers typified by methyl methacrylate and fluorinated monomers such as perfluoroalkyl methacrylate, and acrylic acid ester monomers typified by methyl acrylate and fluorinated monomers such as perfluoroalkyl acrylate is preferred.

The above-mentioned monomers have advantages of being able to form a precise composition distribution and easy to handle because a polymer or copolymer can be obtained easily by applying heat or light. For polymerization, an organic peroxide or azo compound may be added as a polymerization initiator. Typical organic peroxides are 1,1,3,3-tetramethylbutyl peroxy-2-ethylhexanoate, n-butyl-4,4-bis (t-butylperoxy) valerate, 1,1-bis (t-butylperoxy) cyclohexane and the like; however, any organic peroxides may be used as long as radicals are generated by applying heat or light.

Further, mercaptan may be added as a chain transfer agent for molecular weight control. Typical mercaptan is octyl-mercaptan; however, any mercaptan may be used as long as it has the R—SH (R indicates an organic group in this example) structure.

[Fluorescent Agent]

The radiation-emitting fluorescent agent is preferably 2-(4-t-butylphenyl)-5-(4-biphenyl)-1,3,4-oxadiazole (b-PBD), 2-(4-biphenyl)-5-phenyl-1,3,4-oxadiazole (PBD), p-terphenyl (PTP), p-quarter phenyl, 2,5-diphenyloxazole (PPO), 1-phenyl-3-(2,4,6-trimethylphenyl)-2-pyrazoline (PMP), 3-hydroxyflavone (3HF), 4,4'-bis-(2,5-dimethylstyryl)-diphenyl (BDB), 2,5-bis-(5-t-butyl-benzoxazolyl) thiophene (BBOT), 1,4-bis-(2-(5-phenyloxazol) benzene (POPOP), 1,4-bis-(4-methyl-5-phenyl-2-oxazolyl) benzene (DMPOPOP), 1,4-diphenyl-1,3-butadiene (DPB), 1,6-diphenyl-1,3,5-hexatriene (DPH) or the like. Those fluorescent agents may be used alone, or a plurality of fluorescent agents may be mixed. The radiation-emitting fluorescent agent is preferably soluble in a polymerizable monomer and a polymer constituting the core.

[Manufacturing Method]

The graded-index plastic scintillating fiber according to this embodiment is preferably manufactured by using the sequential deposition method disclosed in Patent Literature 6.

Specifically, a mixture of two or more types of radical polymerizable monomers having different refractive indices is injected continuously into a cylindrical container that is placed with its central axis horizontally oriented and rotated about the central axis, through an inlet at the center of one end of the cylindrical container. Note that unavoidable deviations of the central axis from the horizontal direction is allowed.

Here, the mixture is injected, varying the mass mixing ratio of the polymerizable monomers so that the outer periphery side of a resulting plastic rod has a low refractive index and the center side of the same has a high refractive index. Then, polymerized hardened layers having different refractive indices are sequentially deposited from the outer periphery toward the center by deposition of the mixture of the polymerizable monomers on the inner periphery of the cylindrical container by the centrifugal force. A graded-index plastic rod that constitutes the core is thereby obtained.

Each of the two or more types of radical polymerizable monomers that constitute the mixture which is injected into the cylindrical container contains a radiation-emitting fluorescent agent at the same concentration. Thus, the concentration of the fluorescent agent in the mixture is constant even when the mass mixing ratio of the polymerizable monomers varies, and therefore the fluorescent agent can be uniformly contained in the resulting graded-index plastic rod.

The refractive index of the polymerized hardened layer can be obtained based on the mass mixing ratio of each polymerizable monomer that constitutes the mixture and the refractive index of a polymer formed by the polymerization of each single polymerizable monomer.

To increase a difference in refractive index between the center and the outer periphery at the cross-section, it is preferred to continuously vary the mass mixing ratio of the polymerizable monomers to be injected from the outer periphery toward the center so that at the outer periphery is the low refractive index monomer alone and at the center is the high refractive index monomer alone.

Then, the resulting plastic rod is inserted into a plastic pipe having a constant refractive index that constitutes the cladding, thereby obtaining a preform. After that, the tip of the preform is heated to a softening temperature or higher under a reduced pressure and pulled out into a thin fiber. By the pressure reduction, it is possible to prevent an empty space that is left at the center of the plastic rod for monomer injection, a gap between the plastic rod and the pipe and the like from remaining as air bubbles. The reduced pressure is preferably 10 kPa or less.

A single line of the graded-index plastic scintillating fiber is thereby manufactured.

EXAMPLES

An example of the present invention is described hereinafter in more detail; however, the present invention is not limited to the following example. Note that the refractive index described in the example is a literature value at 20° C. or 25° C.

For plastic scintillating fibers according to an example and a comparative example, a resolving time (the degree of modal dispersion) of light signals after being guided through each plastic scintillating fiber was measured and compared. A method of measuring the resolving time is as follows.

A plastic scintillating fiber with a length of 20 m was prepared, its end face was polished using a 1500 grit sandpaper, and then was mirror-polished using an abrasive containing alumina of 0.3 µm.

A photomultiplier tube, which is a photo detector, was placed at one end of the plastic scintillating fiber, and a LED (wavelength=375 nm), which is a light source, was placed on a side face near the end face of the opposite side. A pulse generator for applying a voltage in a pulse form was connected to the LED, and a pulse of 10 ns wavelength was input thereto.

When the pulse is input to the LED, the fluorescent agent in the plastic scintillating fiber absorbs light and emits light of 450 nm wavelength at the center by wavelength conversion, and the light is guided to the photo detector. The signal strength was measured by the photomultiplier tube, and an increase in time from the rising edge to the decay of the received light signal (full width at half maximum: FWHM) from the input pulse was obtained as the resolving time.

Example

A benzyl methacrylate monomer (refractive index of homopolymer: 1.568) and a methyl methacrylate monomer (refractive index of homopolymer: 1.492) were fed by using a pair of micropumps under precise flow control.

In this example, each of the benzyl methacrylate monomer and the methyl methacrylate monomer contains a fluorescent agent p-terphenyl (PTP) 1 mass % and 2,5-bis-(5-t-butyl-benzoxazolyl) thiophene (BBOT) 0.02 mass %, and a polymerization initiator 1,1,3,3-tetramethylbutyl peroxy-2-ethylhexanoate (PO—O) 0.05 mass %, n-butyl-4,4-bis (t-butylperoxy) valerate (PH-V) 0.05 mass %, and a chain transfer agent n-octylmercaptan (n-OM) 0.25 mass % for molecular weight control.

The monomers were fed through a merging point and mixed by a static mixer, and further fed into the inlet. The monomers were then injected into a rotating glass ampoule while varying the feeding amount of the pair of micropumps, and thermally polymerized. As a result, a graded-index plastic rod where the refractive index decreases in a parabolic manner from the innermost part toward the outer periphery was obtained.

This plastic rod and a pipe of 2,2,3,3-tetrafluoropropyl methacrylate (refractive index of homopolymer: 1.417) were combined to form a preform, and dried in a vacuum for two days. This preform was melt and drawn into a fiber under a reduced pressure, and thereby a graded-index plastic scintillating fiber with an outer diameter of 1 mmφ was obtained.

Comparative Example

A fluorescent agent p-terphenyl (PTP) 1 mass % and 2,5-bis-(5-t-butyl-benzoxazolyl) thiophene (BBOT) 0.02 mass % were added to a styrene monomer (refractive index of homopolymer: 1.590), and it was placed into a glass ampoule with an inner diameter of 50 mmφ, vacuum-sealed, and thermally polymerized at a temperature adjusted to 70° C. to 120° C. The glass ampoule was then broken to obtain a polystyrene rod containing a fluorescent agent.

A polymerization initiator (PO—O) 0.05 mass %, a polymerization initiator (PH-V) 0.05 mass % and a chain transfer agent (n-OM) 0.25 mass % were added to a methyl methacrylate monomer. It was placed into a glass ampoule with an inner diameter of 70 mmφ, vacuum-sealed, and thermally polymerized in a heat medium, rotating along the axis direction, and thereby a pipe of polymethyl methacrylate with an outer diameter of 70 mmφ and an inner diameter of 50 mmφ was obtained.

The above-described polystyrene rod and the obtained polymethyl methacrylate pipe were combined to form a preform, and dried in a vacuum for two days. This preform was melt and drawn into a fiber under a reduced pressure, and thereby a plastic scintillating fiber with an outer diameter of 1 mmφ was obtained.

Regarding the plastic scintillating fibers with an outer diameter of 1 mmφ and a length of 20 m obtained in the example and the comparative example, a result of evaluating a resolving time using a photon counter is shown in the following table 1. While the resolving time in the plastic scintillating fiber according to the comparative example was 15.0 ns, the resolving time in the plastic scintillating fiber according to the example was 3.0 ns, which is about one-fifth of the comparative example, and the modal dispersion was reduced significantly.

TABLE 1

|  | Resolving Time (ns) |
|---|---|
| Example | 3.0 |
| Comparative Example | 15.0 |

It should be noted that the present invention is not limited to the above-described exemplary embodiment and may be varied in many ways within the scope of the present invention.

This application is based upon and claims the benefit of priority from Japanese patent application No. 2016-122735, filed on Jun. 21, 2016, the disclosure of which is incorporated herein in its entirety by reference.

REFERENCE SIGNS LIST

1 CORE
2 CLADDING
3 FLUORESCENT AGENT

The invention claimed is:

1. A plastic scintillating fiber, comprising:
   a core; and
   a cladding that covers an outer periphery of the core and has a constant refractive index which is lower than a refractive index of the core,
   wherein the core uniformly comprises a radiation-emitting fluorescent agent and has a refractive index distribution where the refractive index of the core is highest at a center of a cross-section and becomes lower in a parabolic manner with distance from the center toward an outer periphery,
   wherein the refractive index distribution is defined by a varying mass ratio, from the center toward the outer periphery of the core, of two or more radical polymerizable monomers, having different refractive indices in a copolymer of the core,
   wherein each of the two or more radical polymerizable monomers having different refractive indices is selected from the group consisting of a methyl methacrylate monomer, an acrylic acid ester monomer, and an aromatic monomer, and wherein the radiation-emitting fluorescent agent comprises 2-(4-biphenyl)-5phenyl-1,3,4-oxadiazole (PBD), p-terphenyl (PTP), 1-phenyl-3-(2,4,6-trimethylphenyl)-2-pyrazoline (PMP), 3-hydroxyflavone (3HF), 2,5-bis-(5-t-butyl-benzoxazolyl) thiophene (BBOT), and/or 1,4-diphenyl-1,3-butadiene (DPB).

2. The fiber of claim 1, wherein a layer having a constant refractive index corresponding to a lowest refractive index in the core is formed on an outermost periphery of the core.

3. A method of manufacturing the plastic scintillating fiber of claim 1, the method comprising:
manufacturing a graded-index plastic rod by continuously injecting a mixture of the two or more types of radical polymerizable monomers having different refractive indices into a cylindrical container placed with its central axis horizontally oriented and rotated about the central axis through an inlet at a center of one end of the cylindrical container, and depositing hardened layers sequentially from an inner periphery of the cylindrical container toward the central axis by centrifugal force; and
manufacturing a core in a fiber form by heating a tip of the graded-index plastic rod and drawing the graded-index plastic rod into a fiber,
wherein the plastic scintillating fiber comprises the core and a cladding that covers an outer periphery of the core,
wherein, in the manufacturing of the graded-index plastic rod, each of the two or more types of radical polymerizable monomers comprises the radiation-emitting fluorescent agent at the same concentration, and
wherein the mixture is injected while continuously varying a mass mixing ratio of the two or more types of radical polymerizable monomers so that the refractive index of the graded-index plastic rod is highest at a center of a cross-section and becomes lower in a parabolic manner with distance from the center toward an outer periphery.

4. The method of claim 3, further comprising:
inserting the graded-index plastic rod into a plastic pipe having a lower refractive index than the refractive index of the graded-index plastic rod.

5. The method of claim 4, wherein the manufacturing of the core is carried out under a reduced pressure.

6. The method of claim 4, wherein, in the manufacturing of the graded-index plastic rod, a layer having a constant refractive index corresponding to a lowest refractive index in the graded-index plastic rod is formed on an outermost periphery of the graded-index plastic rod.

7. The liber of claim 1, wherein a length of the plastic scintillating fiber is 5 m or longer.

8. The fiber of claim 1, wherein the cladding comprises a polymer or a copolymer of monomeric units selected from the group consisting of methyl methacrylate, perfluoroalkyl methacrylate, methyl acrylate, and perfluoroalkyl acrylate.

9. The fiber of claim 1, wherein the two or more radical polymerizable monomers comprise a benzyl methacrylate monomer and a methyl methacrylate monomer, and the radiation-emitting fluorescent agent is 2,5-bis-(5-t-butyl-benzoxazolyl) thiophene (BBOT).

10. The fiber of claim 1, wherein the refractive index of the core is in a range of from 1.568 to 1.492, and
wherein the refractive index of the cladding is no more than 1.417.

11. The fiber of claim 1, wherein the cladding comprises, in polymerized form, methyl methacrylate.

12. The fiber of claim 1, wherein the cladding comprises, in polymerized form, a fluorinated monomer.

13. The fiber of claim 1, wherein the cladding comprises, in polymerized form, methyl acrylate.

14. The fiber of claim 1, wherein the cladding comprises, in polymerized form, perfluoroalkyl acrylates and/or perfluoroalkyl methacrylate.

15. The fiber of claim 1, wherein the radiation-emitting fluorescent agent consists of 2-(4-biphenyl)-5phenyl-1,3,4-oxadiazole (PBD), p-terphenyl (PTP), 1-phenyl-3-(2,4,6-trimethylphenyl)-2-pyrazoline (PMP), 3-hydroxyflavone (3HF), 2,5-bis-(5-t-butyl-benzoxazolyl) thiophene (BBOT), and/or 1,4-diphenyl-1,3-butadiene (DPB).

16. The fiber of claim 1, wherein the radiation-emitting fluorescent agent consists of 2-(4-biphenyl)-5phenyl-1,3,4-oxadiazole (PBD).

17. The fiber of claim 1, wherein the radiation-emitting fluorescent agent consists of p-terphenyl (PTP), 1-phenyl-3-(2,4,6-trimethylphenyl)-2-pyrazoline (PMP), 3-hydroxyflavone (3HF), 2,5-bis-(5-t-butyl-benzoxazolyl) thiophene (BBOT), and/or 1,4-diphenyl-1,3-butadiene (DPB).

18. The fiber of claim 1, wherein the radiation-emitting fluorescent agent consists of 1-phenyl-3-(2,4,6-trimethylphenyl)-2-pyrazoline (PMP).

19. The fiber of claim 1, wherein the radiation-emitting fluorescent agent consists of 3-hydroxyflavone (3HF) and/or 1,4-diphenyl-1,3-butadiene (DPB).

20. The fiber of claim 1, wherein the radiation-emitting fluorescent agent consists of 2,5-bis-(5-t-butyl-benzoxazolyl) thiophene (BBOT).

\* \* \* \* \*